(12) United States Patent
Kozhisseri Pattath et al.

(10) Patent No.: US 12,493,507 B2
(45) Date of Patent: Dec. 9, 2025

(54) GRANULAR MONITORING AND ALERTING SYSTEM FOR MICROSERVICES

(71) Applicant: SAP SE, Walldorf (DE)

(72) Inventors: Sreekanth Kozhisseri Pattath, Kerala (IN); Sreeram V, Kerala (IN); Sudheernath Reddy Kaipa, Andhra Pradesh (IN); Wei Li, Shanghai (CN); Xiangjun Xiao, Shanghai (CN); Vidhya K, Bangalore (IN)

(73) Assignee: SAP SE, Walldorf (DE)

( * ) Notice: Subject to any disclaimer, the term of this patent is extended or adjusted under 35 U.S.C. 154(b) by 29 days.

(21) Appl. No.: 18/509,700

(22) Filed: Nov. 15, 2023

(65) Prior Publication Data

US 2025/0156258 A1 May 15, 2025

(51) Int. Cl.

| G06F 11/30 | (2006.01) |
|---|---|
| G06F 11/07 | (2006.01) |
| G06F 11/34 | (2006.01) |
| G06F 11/3604 | (2025.01) |

(52) U.S. Cl.
CPC ...... *G06F 11/0766* (2013.01); *G06F 11/3006* (2013.01); *G06F 11/302* (2013.01); *G06F 11/3409* (2013.01); *G06F 11/3616* (2013.01)

(58) Field of Classification Search
CPC ............. G06F 11/0766; G06F 11/3006; G06F 11/302; G06F 11/3409
See application file for complete search history.

(56) References Cited

U.S. PATENT DOCUMENTS

| 9,471,345 | B2 | 10/2016 | Jain | |
|---|---|---|---|---|
| 11,347,622 | B1* | 5/2022 | Agarwal | G06F 11/323 |
| 11,563,636 | B1* | 1/2023 | Kairali | H04L 67/562 |
| 2008/0163270 | A1 | 7/2008 | Mitrov | |
| 2015/0089474 | A1 | 3/2015 | Jain | |
| 2022/0100591 | A1 | 3/2022 | Kohn | |
| 2023/0198959 | A1* | 6/2023 | Martinez-Spessot | G06F 9/547 713/153 |
| 2024/0305541 | A1* | 9/2024 | Singarayan | H04L 43/20 |
| 2024/0386130 | A1* | 11/2024 | Bruce | G06F 21/6245 |

* cited by examiner

*Primary Examiner* — Yolanda L Wilson
(74) *Attorney, Agent, or Firm* — SCHWEGMAN LUNDBERG & WOESSNER, P.A.

(57) ABSTRACT

A computer-implemented method may comprise obtaining thresholds for metrics for microservices, injecting metadata comprising the thresholds for each microservice into a pod within which the microservice is running, obtaining the metrics for the microservices, obtaining the corresponding metadata from the pod within which each microservice is running, determining that one of the thresholds for one of the microservices has been violated using the metadata of the microservice obtained from the corresponding pod of the microservice and the corresponding set of metrics for the microservice, and sending an alert to an electronic destination based on the determining that the threshold for the microservice has been violated. The alert may indicate that the threshold for the microservice has been violated.

20 Claims, 6 Drawing Sheets

GRANULAR MONITORING AND ALERTING SYSTEM FOR MICROSERVICES

BACKGROUND

Microservices are becoming increasingly popular in modern software development. However, as the number of microservices in a cluster grows, monitoring the health of the microservices and generating alerts in real-time becomes more difficult due to the increasing complexities and time consumption of the associated tasks. The traditional approach of manually monitoring microservices and generating alerts is not scalable and can lead to delays in detecting and resolving issues, resulting in service disruptions and degraded user experience. Furthermore, setting up common thresholds for a set of microservices is not scalable and can result in delays in detecting and resolving issues, which can lead to service disruptions and a degraded user experience.

Additionally, traditional monitoring approaches often lack the granularity required to effectively monitor and alert individual microservices within a cluster, which can result in difficulties identifying and isolating specific issues or bottlenecks that may be affecting a particular microservice. Also, inadequate monitoring and alerting mechanisms can lead to excessive resource consumption within clusters. Without proper monitoring, it becomes challenging to identify and optimize resource usage, potentially leading to inefficient allocation and utilization of resources, such as the central processing unit (CPU), memory, and storage. Furthermore, as the number of microservices within a cluster scales, the complexity of monitoring and alerting increases exponentially. Manual monitoring approaches struggle to keep up with the growing number of microservices, resulting in delayed detection of issues and longer resolution times. Another problem is that ineffective monitoring and alerting systems can generate an overwhelming number of false positives or irrelevant alerts, which leads to alert fatigue among system administrators, making it difficult to differentiate critical issues from noise and potentially causing them to miss genuine problems. Additionally, configuring monitoring and alerting parameters for each microservice can be complex and time-consuming. The lack of standardized or automated mechanisms to define and manage monitoring configurations adds to the operational overhead and increases the risk of misconfigurations or inconsistent monitoring practices.

In the context of running thousands of microservices and monolithic applications in a microservices architecture, it is crucial to recognize that the monitoring requirements can vary significantly. A "one size fits all" approach is inadequate and can create visibility gaps, leaving critical areas unchecked. Such gaps can result in production outages. Other technical problems may arise as well.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Example methods and systems of granular monitoring and alerting for microservices are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to implement and provide a central, dynamic, scalable, configurable, modular, and real-time microservice monitoring and alerting system for microservice clusters. The system and method disclosed herein provide cluster operators with a robust and reliable solution to check and manage their microservices effectively, leading to better application performance, increased service uptime, and improved customer satisfaction.

In some example embodiments, a computer system may, for each one of a plurality of microservices, obtain a corresponding set of one or more thresholds for a corresponding set of one or more metrics of the microservice. The computer system may then, for each one of the plurality of microservices, inject corresponding metadata into a pod within which the microservice is running, where the metadata comprises the corresponding set of one or more thresholds for the microservice. Next, the computer system may obtain the corresponding set of one or more metrics for each one of the plurality of microservices, and also, for one of the plurality of microservices, obtain the corresponding metadata from the pod within which the microservice is running. The computer system may then determine that one of the thresholds in the corresponding set of one or more thresholds for the one of the plurality of microservices has been violated using the metadata of the microservice obtained from the corresponding pod of the microservice and the corresponding set of one or more metrics for the microservice. In response to, or otherwise based on, the determining that the one of the thresholds in the corresponding set of one or more thresholds for the one of the plurality of microservices has been violated, the computer system may send an alert to an electronic destination, where the alert indicates that the one of the thresholds for the one of the plurality of microservices has been violated.

The monitoring and alerting system may ensure service reliability and enhance application availability by continuously examining and alerting microservices in real-time, using adjustable thresholds injected into the microservices, collecting metrics of the microservices, and triggering alerts whenever any violations of the thresholds are detected. The monitoring and alerting system of the present disclosure provides a robust and dependable solution for cluster operators to effectively monitor and manage their microservices. By providing scalable thresholds at the microservices level through simple configuration mappings, the features disclosed herein improve application performance, increase service uptime, and enhance customer satisfaction. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

Figure 1:
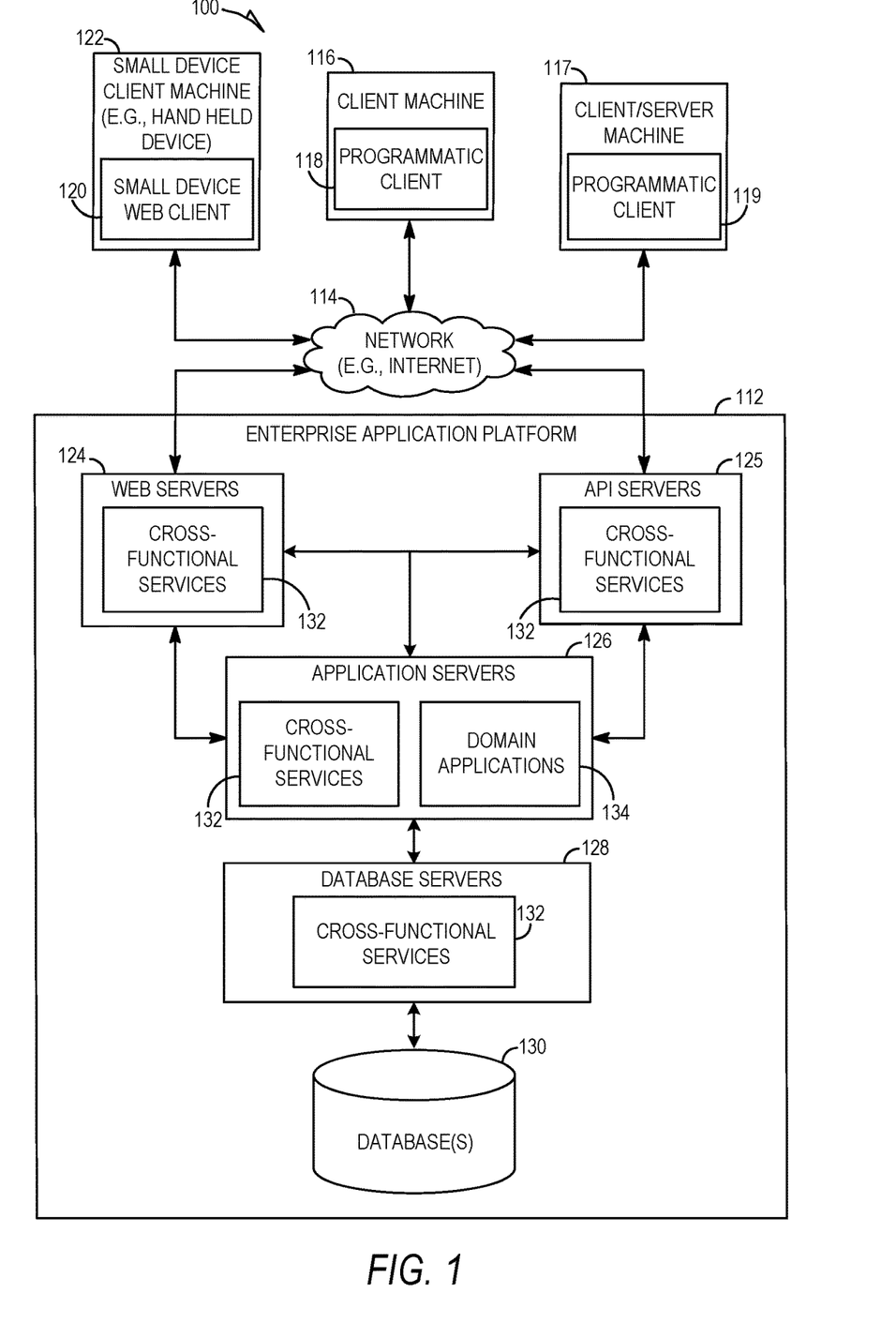
FIG. 1 is an example network diagram illustrating a system.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
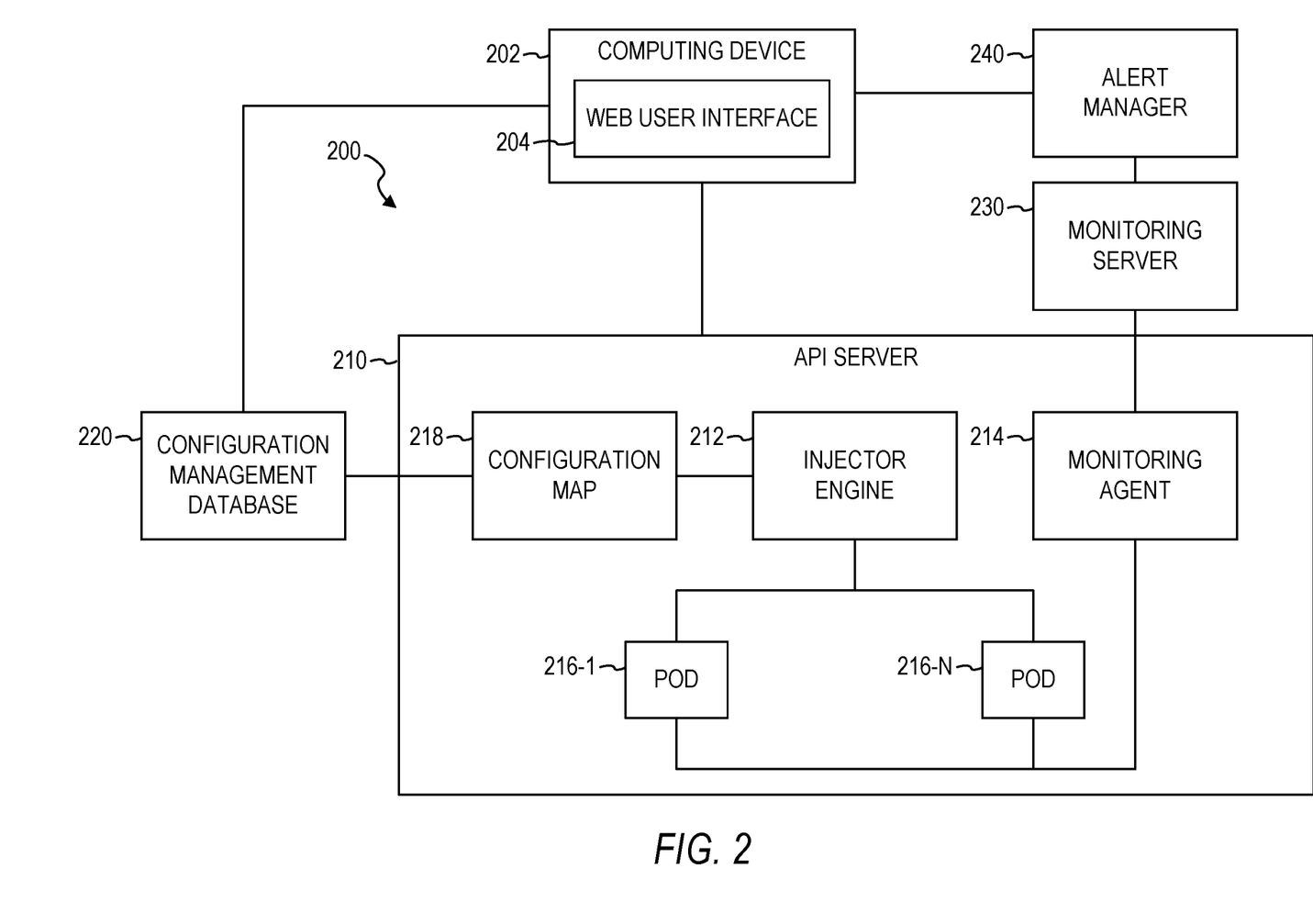
FIG. 2 is a block diagram illustrating an example monitoring and alerting system.

FIG. 2 is a block diagram illustrating an example monitoring and alerting system 200. In some example embodiments, the monitoring and alerting system 200 may comprise any combination of one or more of an injector engine 212, a monitoring agent 214, a configuration map 218, a configuration management database 220, a monitoring server 230, and an alert manager 240. The components shown in FIG. 2 may be configured to communicate with each other via inter-process communication or via one or more network connections, such as via the network 114 in FIG. 1. The injector engine 212, the monitoring agent 214, and the configuration map 218 may be implemented within an API server 210. In some example embodiments, one or more of the components of the monitoring and alerting system 200 may be implemented by the enterprise application platform 112 of FIG. 1. For example, the API server 210 may be incorporated into the into one of the API servers 125 of the enterprise application platform 112, the configuration management database 220 may be incorporated into one of the database servers 128 of the enterprise application platform 112, and the monitoring server 230 and the alert manager 240 may be incorporated into one of the application servers 126 of the enterprise application platform 112. However, other configurations of the components of the monitoring and alerting system 200 are also within the scope of the present disclosure.

In some example embodiments, the API server 210 is configured to provide a container orchestration system that is configured to automate deployment, scaling, and management of containerized applications. Containerized applications may comprise applications run in isolated packages of code called containers. Containers may include all of the dependencies that an application might need to run on any host operating system, such as libraries, binaries, configuration files, and frameworks, into a single lightweight executable.

The containerized applications may comprise microservices that run within a plurality of pods 216 (e.g., pod 216-1 to pod 216-N, where N is a positive integer greater than 1) in the API server 210. Each pod 216 may comprise a group of one or more containers that operate together, with shared storage and network resources, and a specification for how to run the containers. The contents of the pod 216 may be co-located, co-scheduled, and run in a shared context. The pods 216 may reside on corresponding nodes. More than one pod 216 can share the same node. The containers within each pod 216 may share the host node's networking and storage resources, as well as specifications that determine how the containers run. Each pod 216 may have a microservice running within it. For example, in FIG. 2, each one of the plurality of pods 216 may have a microservice running within it, such that a plurality of microservices are running within the plurality of pods 216.

The pod 216 may model an application-specific logical host. For example, the pod 216 may contain one or more application containers that are relatively tightly coupled. The pod 216 may run a single container. In this case, the pod 216 acts as a wrapper around a single container, and the container orchestration system manages the pod rather than managing the containers directly. Alternatively, the pod 216 may run multiple containers that need to work together. For example, the pod 216 can encapsulate an application composed of multiple co-located containers that are tightly coupled and need to share resources. These co-located containers form a single cohesive unit of service. For example, one container may serve data stored in a shared volume to the public, while a separate container may refresh or updates those files. The pod 216 may wrap these containers, storage resources, and an ephemeral network identity together as a single unit.

Although users can create the pods 216 via manual instruction provided through a computing device 202, the container orchestration system implemented by the API server 210 may comprise a controller that creates the pods 216 and pod replicas for high availability or horizontal scaling. For example, when the user requests three new instances of a pod 216, the container orchestration system may create three pods 216 as API-level resources. A scheduler of the container orchestration system may then find the appropriate node for each pod 216 (e.g., based on the user's policies) and place the pod 216 there.

In some example embodiments, a user may access and communicate with the monitoring and alerting system 200 via the computing device 202. For example, the user may configure monitoring thresholds associated with specific microservice names using a web user interface 204 on the computing device 202. These thresholds may then be stored in the configuration management database 220. The configuration management database 220 may comprise a repository of configurations of thresholds for the microservices running on the pods 216. The thresholds may be stored in a human-readable data serialization language, such as in YAML format, making it accessible to any continuous delivery tool.

A continuous delivery tool may take the updated configuration of thresholds from the configuration management database 220 and update the configuration map 218 within a database of a cluster within the API server 210. The configuration map 218 may serve as a central repository for the monitoring thresholds for the microservices running on the pods 216. Whenever the API server 210 receives a request to create a pod 216, the injector engine 212 may be invoked through a mutating webhook. The injector engine 212 may add the thresholds as metadata to the pods 216. The metadata may be in the form of annotations that comprise key-value pairs mapping metrics for the microservice to the thresholds for the microservice.

The monitoring agent 214 may run continuously, watching the parameters specified in the annotations of the pods 216. The monitoring agent 214 may collect the relevant metrics and thresholds for each microservice running on the pods 216 and sends this data to the monitoring server 230 for further processing. The monitoring server 230 may verify whether the collected metrics for each microservice have violated (e.g., exceeded) the corresponding thresholds for the microservice. In response to a determination that one or more of the thresholds of the microservice have been violated by the collected metrics for the microservice, the alert manager 25 may be triggered to send out an alert via the proper channel.

As shown in FIG. 2, the monitoring and alerting system 200 may integrate a web user interface 204 for threshold collection, the configuration management database 220 for storage of threshold configurations, a continuous delivery tool for updating the configuration map 218, the injector engine 212 for annotating pods 216, the monitoring agent 214 for collection of metrics and thresholds from the pods 216, the monitoring server 230 for threshold validation, and the alert manager 240 for generating alerts. The collaboration of these components ensures efficient monitoring of parameters and prompt alerts in case of threshold violations.

In some example embodiments, the injector engine 212 may be implemented using admission controllers. An admission controller is a piece of code that intercepts requests to the API server 210 prior to persistence of an object, but after the request is authenticated and authorized. Admission controllers may be validating, mutating, or both. Mutating controllers may modify objects related to the requests they admit, whereas validating controllers may not.

In some example embodiments, the API server 210 may receive requests to create or modify microservices. These requests may be intercepted by an admission controller of the injector engine 212, which may then inject annotations into the microservice deployment or pod template specifications. The annotations may specify the monitoring requirements, such as metrics to be checked and the thresholds and alerting rules for each metric. The use of admission controllers to realize the injector engine 212 ensures that the annotations are applied consistently and uniformly across all instances of the microservices. The monitoring agent 214 may then collect the monitoring data from the microservices running in the pods 216, along with the annotations injected by the injector engine 212. The monitoring agent 214 may send this collected data to the monitoring server 230. The monitoring server 230 may compare each collected metric to the corresponding threshold to determine whether any of the thresholds have been violated. For example, the monitoring server 230 may compare a collected metric for CPU usage for a microservice with a CPU usage threshold for that microservice to determine whether the CPU usage threshold has been violated (e.g., exceeded).

If the monitoring server 230 determines that a threshold has been violated, then the monitoring server 230 may trigger the alert manager 240 to send an alert to an electronic destination based on the determination that the threshold has been violated. In some example embodiments, the electronic destination may comprise any physical or virtual component that is capable of receiving an electronic message or other piece of digital communication. Examples of electronic destinations include, but are not limited to, e-mail addresses or accounts, cell phone numbers or accounts, messaging application addresses or accounts, a graphical user interface, or a software application. Other types of electronic destinations are also within the scope of the present disclosure. The alert may indicate that the threshold has been violated, and it may comprise one or more details of the violations, such as an identification of the microservice for which the threshold was violated, an identification of the pod 216 in which the microservice is running, the type and value of the metric that exceeded the threshold, and the threshold value that has been violated. The sending of the alert to the electronic destination may comprise causing the alert to be displayed on a computing device 202.

Figure 3:
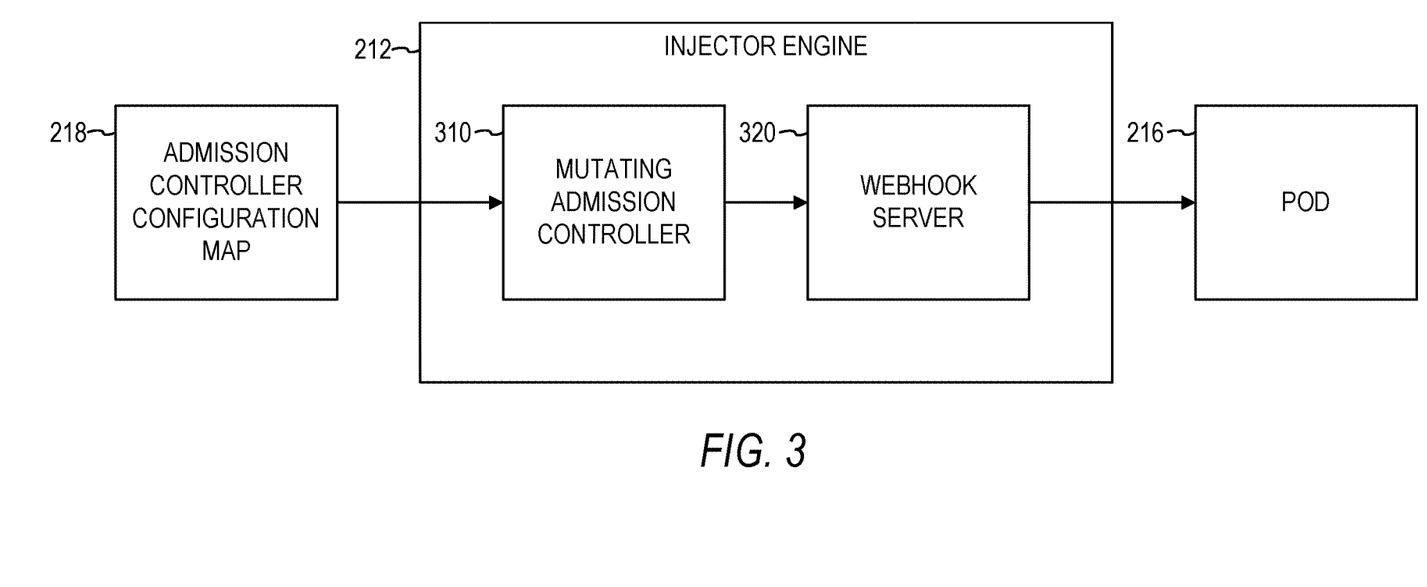
FIG. 3 is a block diagram illustrating an example architecture of an injector engine.

FIG. 3 is a block diagram illustrating an example architecture of the injector engine 212. In FIG. 3, the injector engine 212 may comprise a mutating admission controller 310 and a webhook server 330. The configuration map 218 may provide the injector engine 212 with necessary configurations and annotations to apply to the pod 216. The configuration map 218 may comprise an API object that enables the API server 210 to store configurations for other objects in the API server 210 to use. The configuration map 218 may comprise fields that accept key-value pairs as their values, which may be used to configure the container(s) in a pod 216. The mutating admission controller 310 may intercept requests, such as pod creation requests and pod update requests, that are sent to the API server 210. The webhook server 320 may receive the intercepted requests from the mutating admission controller 310, and then may use a mutating webhook to modify the intercepted request to invoke the injection of the metadata into the pod 216. The metadata may comprise annotations that indicate the threshold(s) for the microservice(s). The pod 216 may hold the microservice and store the annotations that can be used by the monitoring agent 214 to collect metrics data on the performance and health of the corresponding microservice.

In some example embodiments, the configuration map 218 may comprise an object that includes the configurations and annotations to be applied to the microservices pods 216 during creation or update of the pods 216. The configuration map 218 can be stored in a cluster on the API server 210 or in external storage, and it can be easily updated by administrators or developers via the web user interface 204 to reflect changes in the monitoring or alerting requirements. The configuration map 218 can also be versioned to track changes over time and ensure that the correct configuration is applied to each microservice pod 216.

The injector engine 212 may periodically check for updates to the configuration map 218 and apply any changes to the microservice pods 216. The injector engine 212 may also supply an API or web user interface for developers and operators to update the configuration manually. The injector engine 212 may be configured to confirm the monitoring and alerting requirements in the configuration map 218 to ensure that they are valid and consistent with the microservice pod 216. The injector engine 212 may use a schema or a set of validation rules to perform this validation.

The following is one example of the configurations stored within the configuration map 218:

```
apiVersion: v1
kind: ConfigMap
metadata:
    name: injector-engine-config
    namespace: default
data:
    app1-config. yaml: |-
        service:
            name: app1
            pod_monitoring: true
            url_monitoring: true
            cpu_threshold: 80
            memory_threshold: 80
            network_threshold: 80
            status_threshold: 500
    app2-config. yaml: |-
        service:
            name: app2
            pod_monitoring: true
            url_monitoring: false
            cpu_threshold: 90
            memory_threshold: 90
            network_threshold: 90
            status_threshold: 503
```

In the example above, there are two microservices, app1 and app2, and each has its own configuration defined in the configuration map 218. The service section defines the service name and monitoring requirements, including whether pod and/or URL monitoring is needed, as well as the thresholds for CPU, memory, network, and status. Although not shown, the configuration map may also comprise an annotations section that includes the annotations to be applied to the microservice pods 216, such as the service name and URL for health monitoring using liveness probes.

When the injector engine 212 receives a request to create or update a microservice pod 216, it may read the service name from the request and retrieve the corresponding configuration from the configuration map 218. The injector engine 212 may then apply the necessary annotations and configurations to the microservice pod 216 before it is created or updated based on the specific monitoring and alerting requirements of that service.

The annotations that the injector engine 212 may apply may include resource limits and requests. For example, the injector engine 212 can set resource limits and requests for CPU, memory, and other resources to ensure that the microservice has sufficient resources to run without causing performance issues or crashing. The annotations may also include configurations for liveness and readiness probes to check the health of the microservice and decide whether it is ready to receive traffic or needs to be restarted. The annotations may further include labels and selectors that the injector engine 212 can apply to the microservice to make it easier to manage and check within the cluster. Configurations for log and metric collection may also be included in the annotations, such that the injector engine 212 can configure log and metric collection for the microservice, allowing developers and operators to check performance and troubleshoot issues. The annotations may also include alerting rules based on performance metrics and thresholds to alert developers and operators when the microservice is not performing as expected or when issues arise.

The API server 210 may comprise a monitoring controller that uses an operator pattern involving a control loop that continuously checks the state of a resource and ensures that it still is in the desired state. The monitoring controller may handle retrieving the monitoring and alerting requirements of each microservice pod 216 and using them to configure the monitoring agent 214 to collect data about the pod's resource use (e.g., CPU, memory, network) and status. The monitoring controller may fetch this data from the monitoring agent 214 and process it to detect any anomalies or errors that might require alerts to be sent. To achieve this, the monitoring controller may use the annotations injected by the injector engine 212 during the pod creation process. These annotations may have information about the pod's name, the type of monitoring required (e.g., pod monitoring or URL monitoring), and the specific metrics to be collected by monitoring agent 214. The monitoring controller may parse these annotations and use them to generate a monitoring agent configuration file that is tailored to the requirements of the microservice pod 216.

Once the configuration is generated, the monitoring controller may deploy it to the pod 216 by creating a configuration map 218 that has the configuration data and mounting it as a volume in the pod's file system. The monitoring agent 214 may then be started as a daemon set in the cluster, with each pod 216 collecting data about the resources and status of the microservices it handles.

The monitoring controller may periodically fetch the monitoring data from the monitoring agent 214 and process it to detect any anomalies or errors. If any issues are detected, the monitoring controller may send alerts to the relevant channels using the configured notification settings. The alerts may include details about the issue detected, such as the pod name, the type of issue (e.g., high CPU usage, unresponsive pod), and any other information that may be relevant to the issue.

Figure 4:
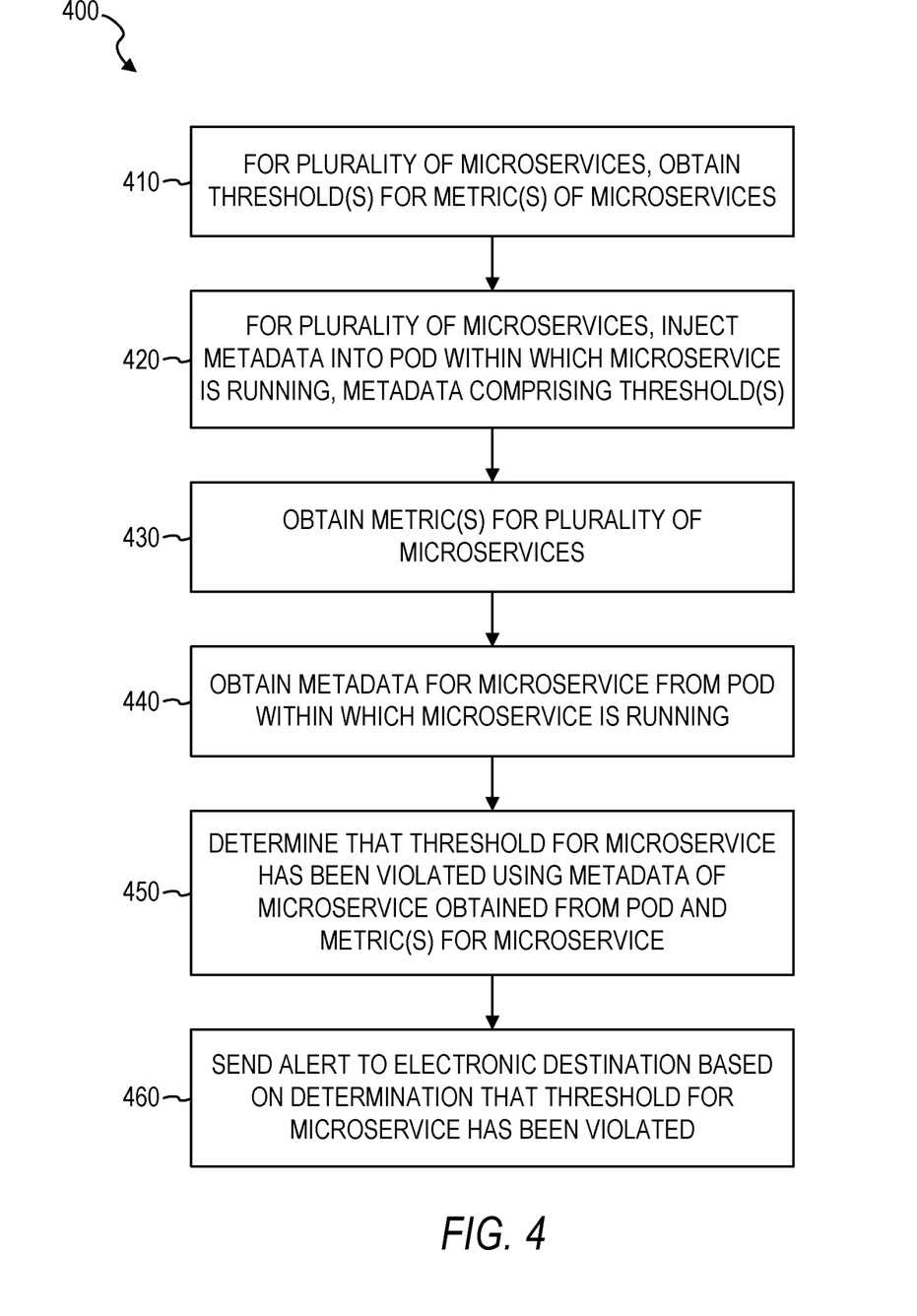
FIG. 4 is a flowchart illustrating an example method of granular monitoring and alerting for microservices.

FIG. 4 is a flowchart illustrating an example method 400 of granular monitoring and alerting for microservices. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the monitoring and alerting system 200 of FIG. 2 or any combination of one or more of its components. For example, the operations of the method 300 may be performed by any combination of one or more of the injector engine 212, the monitoring agent 214, the monitoring server 230, or the alert manager 240.

At operation 410, the monitoring and alerting system 200 may, for each one of a plurality of microservices, obtain a corresponding set of one or more thresholds for a corresponding set of one or more metrics of the microservice. In some example embodiments, two or more of the plurality of microservices may run within a same pod 216 as each other, while the two or more microservices may run within separate containers from each other. However, other configurations of the plurality of microservices are also within the scope of the present disclosure.

The corresponding set of one or more metrics for the microservice may comprise one or more metrics of usage of one or more resources of the pod 216 within which the microservice is running. The one or more resources of the pod 216 may comprise a central processing unit, a memory, or a network. However, other types of metrics and other types of resources of the pod 216 are also within the scope of the present disclosure.

The one or more metrics for the microservice may comprise at least one of: a central processing unit (CPU) utilization metric (e.g., a measure of the total percentage of processing power exhausted to process data and run the microservice), a memory utilization metric (e.g., a measure of the amount of memory being used by the microservice), a disk usage metric (e.g., a number of reads and writes by the microservice per second), a metric of received requests (e.g., a number of requests received by the microservice per minute), a latency metric (e.g., a measure of delay in the microservice responding to a request), an error rate metric (e.g., a measure of how often a request sent to the microservice results in an error), a load capacity metric (e.g., the maximum demand, stress, or load that may be placed on the microservice under normal or otherwise specified conditions for an extended period of time), or an availability metric (e.g., an uptime measurement indicating the percentage of time the microservice is available to serve requests, a downtime measurement indicating the percentage of time the microservice is unavailable to serve requests). The one or more metrics for the microservice may also comprise one or more metrics of a network being used by the microservice. The one or more metrics of the network may include, but are not limited to, at least one of: a latency metric (e.g., a measure of delay in communication over the network), a jitter metric (e.g., a measure of variance in latency), a packet loss metric (e.g., a measure of how many packets of data travelling across the network fail to reach their destination), a bandwidth metric (e.g., a maximum rate of data transfer across the network), or a throughput metric (e.g., a rate of successful message delivery over the network). Other types of metrics for the microservice are also within the scope of the present disclosure.

Next, the monitoring and alerting system 200 may, for each one of the plurality of microservices, inject corresponding metadata into a pod within which the microservice is running, at operation 420. The metadata may comprise the corresponding set of one or more thresholds for the microservice. In some example embodiments, the metadata may comprise one or more key-value pairs mapping the set of one or more metrics for the microservice to the set of one or more thresholds for the microservice. However, other configurations of the metadata are also within the scope of the present disclosure. The injecting of the corresponding metadata into the pod 216 within which the microservice is running may comprise mounting the corresponding metadata in a file system of the pod 216. However, the metadata may be injected into the pod 216 in other ways as well.

The monitoring and alerting system 200 may then, at operation 430, obtain the corresponding set of one or more metrics for each one of the plurality of microservices. In some example embodiments, each set of one or more metrics may be obtained from the pod 216 within which the corresponding microservice is running. For example, the monitoring agent 214 may periodically request (e.g., fetch) the set of one or more metrics from the pods 216 or the pods 216 may periodically send (e.g., push) the set of one or more metrics to the monitoring agent 214. The set of one or more metrics may be obtained in other ways and from other sources as well.

At operation 440, the monitoring and alerting system 200 may, for one of the plurality of microservices, obtain the corresponding metadata from the pod 216 within which the microservice is running. For example, the monitoring agent 214 may periodically request (e.g., fetch) the corresponding metadata from the pods 216 or the pods 216 may periodically send (e.g., push) the corresponding metadata to the monitoring agent 214. Other ways of obtaining the metadata from the pods 216 are also within the scope of the present disclosure.

Next, the monitoring and alerting system 200 may determine that one of the thresholds in the corresponding set of one or more thresholds for the one of the plurality of microservices has been violated using the metadata of the microservice obtained from the corresponding pod of the microservice and the corresponding set of one or more metrics for the microservice, at operation 450. In some example embodiments, the determining that the one of the alerting rules has been violated may comprise determining that one of the one or more thresholds has been exceeded based on one of metrics in the corresponding set of one or more metrics for the microservice.

The monitoring and alerting system 200 may then, at operation, 460, send an alert to an electronic destination based on the determining that the one of the thresholds in the corresponding set of one or more thresholds for the one of the plurality of microservices has been violated. The alert may indicate that the one of the thresholds for the one of the plurality of microservices has been violated. The sending of the alert to the electronic destination may comprise causing the alert to be displayed on a computing device 202. The alert may comprise an identification of the corresponding pod 216 on which the one of the plurality of microservices is running and an identification of the one of the thresholds that had been violated.

In some example embodiments, the electronic destination may comprise any physical or virtual component that is capable of receiving an electronic message or other piece of digital communication. Examples of electronic destinations include, but are not limited to, e-mail addresses or accounts, cell phone numbers or accounts, messaging application addresses or accounts, a graphical user interface, or a software application. Other types of electronic destinations are also within the scope of the present disclosure.

It is contemplated that any of the other features described within the present disclosure can be incorporated into the method 400.

Figure 5:
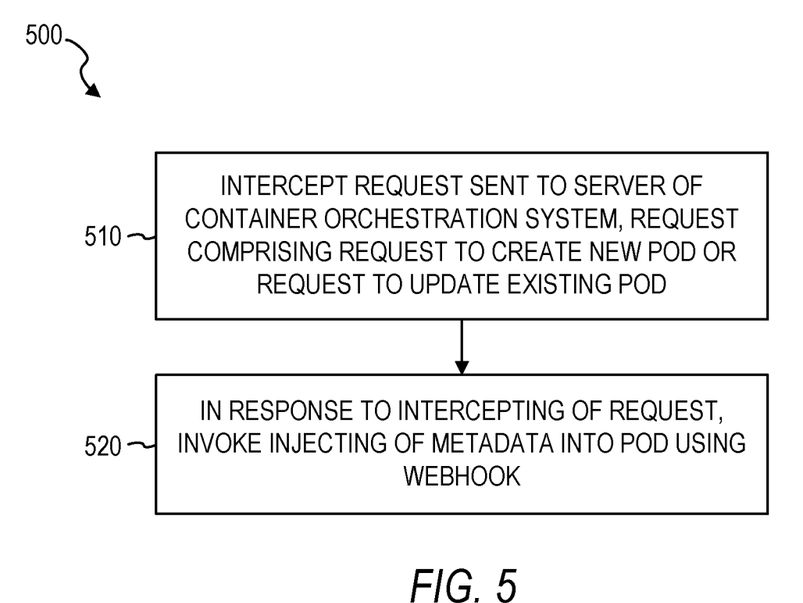
FIG. 5 is a flowchart illustrating an example method of injecting metadata into a pod.

FIG. 5 is a flowchart illustrating an example method 500 of injecting metadata into a pod. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the monitoring and alerting system 200 of FIG. 2 or any combination of one or more of its components. For example, the operations of the method 500 may be performed by the injector engine 212.

At operation 510, the monitoring and alerting system 200 may intercept a request sent to a server of a container orchestration system. The request may comprise a request to create a new pod or a request to update an existing pod. In some example embodiments, the mutating admission controller may intercept the request that is being sent to the API server 210, as previously discussed with respect to FIG. 3.

Then, the monitoring and alerting system 200 may, at operation 520, invoke the injecting of the corresponding metadata into the pod 216 using a webhook in response to, or otherwise based on, the intercepting of the request. Webhooks are user-defined Hypertext Transfer Protocol (HTTP) callbacks that may be triggered by some event. When that event occurs, the source site can make an HTTP request to the Uniform Resource Locator (URL) configured for the webhook. In some example embodiments, a webhook server may use a mutating webhook to modify the intercepted request to invoke the injection of the metadata into the pod 216, as previously discussed with respect to FIG. 3.

It is contemplated that any of the other features described within the present disclosure can be incorporated into the method 400.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: for each one of a plurality of microservices, obtaining a corresponding set of one or more thresholds for a corresponding set of one or more metrics of the microservice; for each one of the plurality of microservices, injecting corresponding metadata into a pod within which the microservice is running, the metadata comprising the corresponding set of one or more thresholds for the microservice; obtaining the corresponding set of one or more metrics for each one of the plurality of microservices; for one of the plurality of microservices, obtaining the corresponding metadata from the pod within which the microservice is running; determining that one of the thresholds in the corresponding set of one or more thresholds for the one of the plurality of microservices has been violated using the metadata of the microservice obtained from the corresponding pod of the microservice and the corresponding set of one or more metrics for the microservice; and sending an alert to an electronic destination based on the determining that the one of the thresholds in the corresponding set of one or more thresholds for the one of the plurality of microservices has been violated, the alert indicating that the one of the thresholds for the one of the plurality of microservices has been violated.

Example 2 includes the computer-implemented method of example 1, wherein at least two of the plurality of microservices are running within a same pod as each other, the at least two of the plurality of microservices running within separate containers from each other.

Example 3 includes the computer-implemented method of example 1 or example 2, wherein the determining that the one of the alerting rules has been violated comprises determining that one of the one or more thresholds has been exceeded based on one of metrics in the corresponding set of one or more metrics for the microservice.

Example 4 includes the computer-implemented method of any one of examples 1 to 3, wherein the corresponding set of one or more metrics for the microservice comprises one or more metrics of usage of one or more resources of the pod within which the microservice is running, the one or more resources of the pod comprising a central processing unit, a memory, or a network.

Example 5 includes the computer-implemented method of any one of examples 1 to 4, wherein the metadata comprises one or more key-value pairs mapping the set of one or more metrics for the microservice to the set of one or more thresholds for the microservice.

Example 6 includes the computer-implemented method of any one of examples 1 to 5, wherein the injecting of the corresponding metadata into the pod within which the microservice is running comprises mounting the corresponding metadata in a file system of the pod.

Example 7 includes the computer-implemented method of any one of examples 1 to 6, wherein the injecting of corresponding metadata into the pod within which the microservice is running comprises: intercepting a request sent to a server of a container orchestration system, the request comprising a request to create a new pod or a request to update an existing pod; and in response to the intercepting of the request, invoking the injecting of the corresponding metadata into the pod using a webhook.

Example 8 includes the computer-implemented method of any one of examples 1 to 7, wherein the sending of the alert to the electronic destination comprises causing the alert to be displayed on a computing device.

Example 9 includes the computer-implemented method of any one of examples 1 to 8, wherein the alert comprises an identification of the corresponding pod on which the one of the plurality of microservices is running and an identification of the one of the thresholds that had been violated.

Example 10 includes a system comprising: at least one processor; and a non-transitory computer-readable medium storing executable instructions that, when executed, cause the at least one processor to perform the method of any one of examples 1 to 9.

Example 11 includes a non-transitory machine-readable storage medium, tangibly embodying a set of instructions that, when executed by at least one processor, causes the at least one processor to perform the method of any one of examples 1 to 9.

Example 12 includes a machine-readable medium carrying a set of instructions that, when executed by at least one processor, causes the at least one processor to carry out the method of any one of examples 1 to 9.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 6:
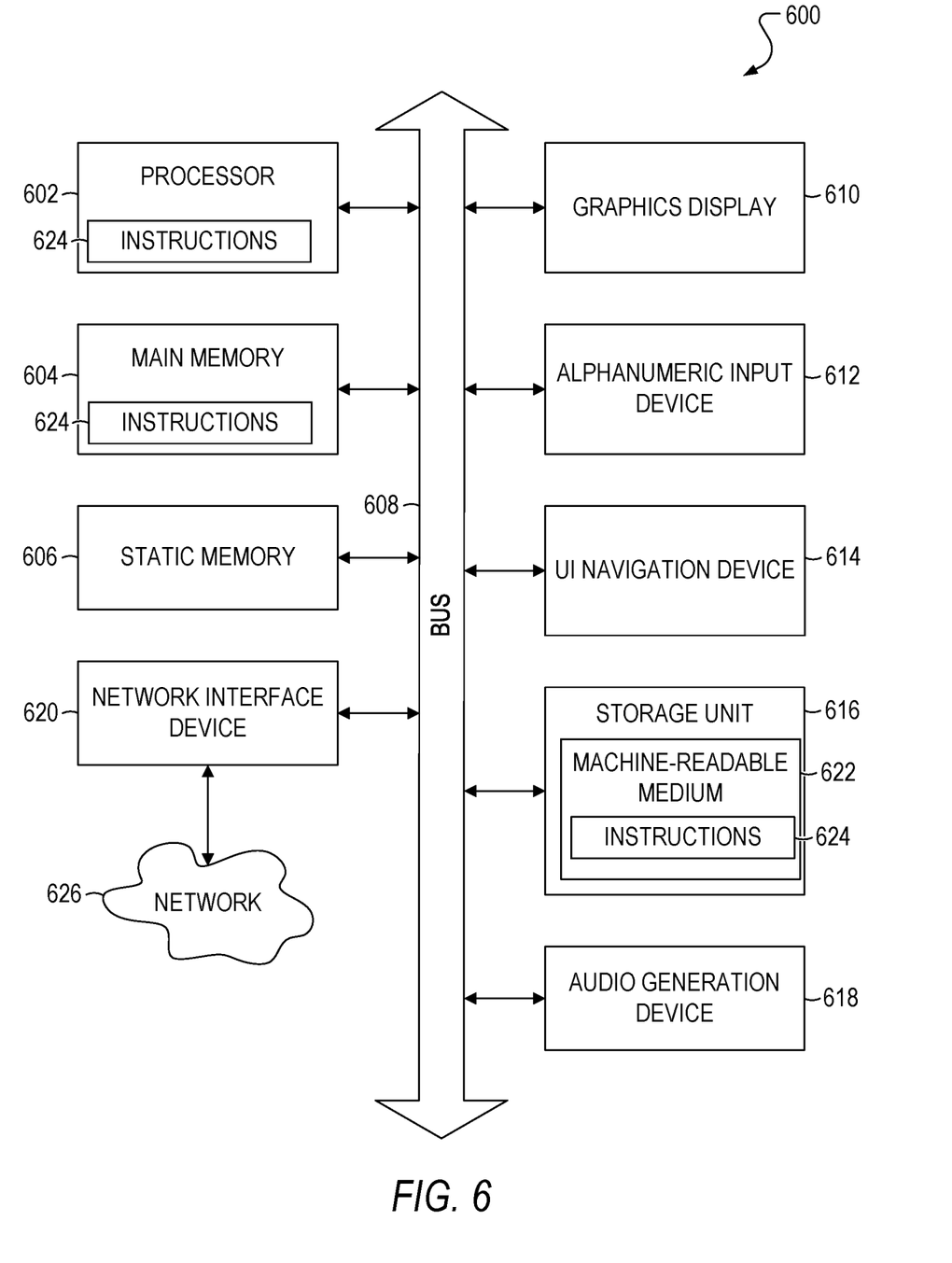
FIG. 6 is a block diagram of an example computer system on which methodologies described herein can be executed.

FIG. 6 is a block diagram of a machine in the example form of a computer system 600 within which instructions 624 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
   for each one of a plurality of microservices, obtaining a corresponding set of one or more thresholds for a corresponding set of one or more metrics of the microservice;
   for each one of the plurality of microservices, injecting corresponding metadata into a pod within which the microservice is running, the corresponding metadata comprising the corresponding set of one or more thresholds for the microservice, wherein the injecting of the corresponding metadata comprises:
      intercepting, by an admission controller, a request sent to a server of a container orchestration system, the request comprising a request to create a new pod or a request to update an existing pod;
      receiving, by a webhook server, the intercepted request from the admission controller; and
      in response to the receiving of the intercepted request, injecting, by a webhook of the webhook server, the corresponding metadata into the pod within which the microservice is running by mounting the corresponding metadata in a file system of the pod;
   obtaining the corresponding set of one or more metrics for each one of the plurality of microservices;
   for one of the plurality of microservices, obtaining the corresponding metadata from the pod within which the microservice is running;
   determining that one of the thresholds in the corresponding set of one or more thresholds for the one of the plurality of microservices has been violated using the corresponding metadata of the microservice obtained from the pod of the microservice and the corresponding set of one or more metrics for the one of the plurality of microservices; and
   sending an alert to an electronic destination based on the determining that the one of the thresholds in the corresponding set of one or more thresholds for the one of the plurality of microservices has been violated, the alert indicating that the one of the thresholds for the one of the plurality of microservices has been violated.

2. The computer-implemented method of claim 1, wherein at least two of the plurality of microservices are running within a same pod as each other, the at least two of the plurality of microservices running within separate containers from each other.

3. The computer-implemented method of claim 1, wherein the determining that the one of the thresholds has been violated comprises determining that one of the one or more thresholds has been exceeded based on one of the metrics in the corresponding set of one or more metrics for the one of the plurality of microservices.

4. The computer-implemented method of claim 1, wherein the corresponding set of one or more metrics for the one of the plurality of microservices comprises one or more metrics of usage of one or more resources of the pod within which the one of the plurality of microservices is running, the one or more resources of the pod comprising a central processing unit, a memory, or a network.

5. The computer-implemented method of claim 1, wherein the corresponding metadata comprises one or more key-value pairs mapping the corresponding set of one or more metrics for the one of the plurality of microservices to the corresponding set of one or more thresholds for the one of the plurality of microservices.

6. The computer-implemented method of claim 1, wherein the sending of the alert to the electronic destination comprises causing the alert to be displayed on a computing device.

7. The computer-implemented method of claim 1, wherein the alert comprises an identification of the pod on which the one of the plurality of microservices is running and an identification of the one of the thresholds that had been violated.

8. A system comprising:
   at least one hardware processor; and
   a non-transitory computer-readable medium storing executable instructions that, when executed, cause the at least one hardware processor to perform computer operations comprising:
      for each one of a plurality of microservices, obtaining a corresponding set of one or more thresholds for a corresponding set of one or more metrics of the microservice;

for each one of the plurality of microservices, injecting corresponding metadata into a pod within which the microservice is running, the corresponding metadata comprising the corresponding set of one or more thresholds for the microservice, wherein the injecting of the corresponding metadata comprises:

intercepting, by an admission controller, a request sent to a server of a container orchestration system, the request comprising a request to create a new pod or a request to update an existing pod;

receiving, by a webhook server, the intercepted request from the admission controller; and in response to the receiving of the intercepted request, injecting, by a webhook of the webhook server, the corresponding metadata into the pod within which the microservice is running by mounting the corresponding metadata in a file system of the pod;

obtaining the corresponding set of one or more metrics for each one of the plurality of microservices;

for one of the plurality of microservices, obtaining the corresponding metadata from the pod within which the microservice is running;

determining that one of the thresholds in the corresponding set of one or more thresholds for the one of the plurality of microservices has been violated using the corresponding metadata of the microservice obtained from the pod of the microservice and the corresponding set of one or more metrics for the one of the plurality of microservices; and sending an alert to an electronic destination based on the determining that the one of the thresholds in the corresponding set of one or more thresholds for the one of the plurality of microservices has been violated, the alert indicating that the one of the thresholds for the one of the plurality of microservices has been violated.

9. The system of claim 8, wherein at least two of the plurality of microservices are running within a same pod as each other, the at least two of the plurality of microservices running within separate containers from each other.

10. The system of claim 8, wherein the determining that the one of the thresholds has been violated comprises determining that one of the one or more thresholds has been exceeded based on one of the metrics in the corresponding set of one or more metrics for the one of the plurality of microservices.

11. The system of claim 8, wherein the corresponding set of one or more metrics for the one of the plurality of microservices comprises one or more metrics of usage of one or more resources of the pod within which the one of the plurality of microservices is running, the one or more resources of the pod comprising a central processing unit, a memory, or a network.

12. The system of claim 8, wherein the corresponding metadata comprises one or more key-value pairs mapping the corresponding set of one or more metrics for the microservice to the corresponding set of one or more thresholds for the one of the plurality of microservices.

13. The system of claim 8, wherein the sending of the alert to the electronic destination comprises causing the alert to be displayed on a computing device.

14. The system of claim 8, wherein the alert comprises an identification of the pod on which the one of the plurality of microservices is running and an identification of the one of the thresholds that had been violated.

15. A non-transitory machine-readable storage medium tangibly embodying a set of instructions that, when executed by at least one hardware processor, causes the at least one hardware processor to perform computer operations comprising:

for each one of a plurality of microservices, obtaining a corresponding set of one or more thresholds for a corresponding set of one or more metrics of the microservice;

for each one of the plurality of microservices, injecting corresponding metadata into a pod within which the microservice is running, the corresponding metadata comprising the corresponding set of one or more thresholds for the microservice, wherein the injecting of the corresponding metadata comprises:

intercepting, by an admission controller, a request sent to a server of a container orchestration system, the request comprising a request to create a new pod or a request to update an existing pod;

receiving, by a webhook server, the intercepted request from the admission controller; and in response to the receiving of the intercepted request, injecting, by a webhook of the webhook server, the corresponding metadata into the pod within which the microservice is running by mounting the corresponding metadata in a file system of the pod;

obtaining the corresponding set of one or more metrics for each one of the plurality of microservices;

for one of the plurality of microservices, obtaining the corresponding metadata from the pod within which the microservice is running;

determining that one of the thresholds in the corresponding set of one or more thresholds for the one of the plurality of microservices has been violated using the corresponding metadata of the microservice obtained from the pod of the microservice and the corresponding set of one or more metrics for the one of the plurality of microservices; and sending an alert to an electronic destination based on the determining that the one of the thresholds in the corresponding set of one or more thresholds for the one of the plurality of microservices has been violated, the alert indicating that the one of the thresholds for the one of the plurality of microservices has been violated.

16. The non-transitory machine-readable storage medium of claim 15, wherein the determining that the one of the thresholds has been violated comprises determining that one of the one or more thresholds has been exceeded based on one of the metrics in the corresponding set of one or more metrics for the one of the plurality of microservices.

17. The non-transitory machine-readable storage medium of claim 15, wherein the corresponding set of one or more metrics for the one of the plurality of microservices comprises one or more metrics of usage of one or more resources of the pod within which the microservice is running, the one or more resources of the pod comprising a central processing unit, a memory, or a network.

18. The non-transitory machine-readable storage medium of claim 15, wherein the corresponding metadata comprises one or more key-value pairs mapping the set of one or more metrics for the microservice to the set of one or more thresholds for the microservice.

19. The non-transitory machine-readable storage medium of claim 15, wherein at least two of the plurality of microservices are running within a same pod as each other, the at least two of the plurality of microservices running within separate containers from each other.

20. The non-transitory machine-readable storage medium of claim 15, wherein the sending of the alert to the electronic destination comprises causing the alert to be displayed on a computing device.

\* \* \* \* \*